United States Patent
Lessin et al.

(10) Patent No.: US 10,325,287 B2
(45) Date of Patent: Jun. 18, 2019

(54) ADVERTISING BASED ON USER TRENDS IN AN ONLINE SYSTEM

(71) Applicant: Facebook, Inc., Menlo Park, CA (US)

(72) Inventors: Samuel Lessin, Palo Alto, CA (US); Justin Alexander Shaffer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 361 days.

(21) Appl. No.: 13/681,161

(22) Filed: Nov. 19, 2012

(65) Prior Publication Data
US 2014/0143057 A1 May 22, 2014

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
CPC ............... G06Q 30/0261; G06Q 50/01; G06Q 30/0237; G06Q 30/02; G06Q 30/0278; G06Q 10/30; G06Q 20/382
USPC ................................ 705/14.64, 14.37, 14.58
See application file for complete search history.

(56) References Cited

U.S. PATENT DOCUMENTS

| | | | | |
|---|---|---|---|---|
| 7,941,383 B2 * | 5/2011 | Heck | ................. | G06F 17/30873 706/21 |
| 7,974,983 B2 * | 7/2011 | Goeldi | ......................... | 707/769 |
| 8,601,089 B2 * | 12/2013 | Bowman et al. | ............. | 709/217 |
| 8,630,897 B1 * | 1/2014 | Prada Gomez et al. | ... | 705/14.11 |
| 8,676,937 B2 * | 3/2014 | Rapaport | ................ | H04L 51/32 709/219 |
| 2008/0306826 A1 * | 12/2008 | Kramer et al. | .................. | 705/14 |
| 2009/0024477 A1 * | 1/2009 | Kramer et al. | .................. | 705/14 |
| 2009/0157486 A1 * | 6/2009 | Gross | .............................. | 705/10 |
| 2009/0293085 A1 * | 11/2009 | Bailey et al. | .................... | 725/32 |
| 2011/0093340 A1 * | 4/2011 | Kramer et al. | ............. | 705/14.58 |
| 2012/0290950 A1 * | 11/2012 | Rapaport et al. | ............. | 715/753 |
| 2013/0007809 A1 * | 1/2013 | Hays | ............................... | 725/47 |
| 2013/0073374 A1 * | 3/2013 | Heath | ........................ | 705/14.39 |
| 2013/0238425 A1 * | 9/2013 | Saldanha et al. | .......... | 705/14.48 |

OTHER PUBLICATIONS

Chakrabati, Mining the web, Elsevier, 2003, pp. 81-123, 289-306.*
Pallotta, Advances in Distributed Agent-Based Retrieval Tools, Springer, 2011, pp. 1-12.*
Algorithms + Data Structures = Programs, 1976, pp. xii-55.*
Streetlights and Shadows, MIT Press, 2009, pp. 33-47.*
The future of the internet—and how to stop It, Yale University Press, 2008, Chapter(s) 1-9, [emphasis pp. 11-18].*

* cited by examiner

*Primary Examiner* — Matthew T Sittner
*Assistant Examiner* — Michael I Ezewoko
(74) *Attorney, Agent, or Firm* — Fenwick & West LLP

(57) ABSTRACT

An online system, such as a social networking system, may determine user trends and identify actions to be taken by users that may help optimize revenue for an advertiser. A social networking system may generate offers for an advertiser based on the user trends, user characteristics, and claims about users where the offers include actions determined by the social networking system that users may take to help optimize revenue for advertiser. Venues may also sell ad space, ad inventory, and real-time customer data to advertisers through a social networking system.

12 Claims, 6 Drawing Sheets

ADVERTISING BASED ON USER TRENDS IN AN ONLINE SYSTEM

BACKGROUND

This invention relates generally to social networking, and in particular to advertising based on user trends in an online system.

In recent years, online systems, such as social networking systems, have enabled users to share their interests and preferences for real-world concepts, such as their favorite restaurants, bars, movies, musicians, celebrities, soft drinks, hobbies, sports teams, and activities. Users have also shared their current interests by sharing their current locations at real-world venues, such as coffee shops, restaurants, bars, and clubs. Tools have been designed to create nodes in social networking systems representing web pages and external systems that embody these real-world concepts on different domains external to the social networking system, such as products, venues, brands, and websites.

At the same time, users of social networking systems have shared information about their interests and current locations, created plans at venues by generating events, and engaged with other users of the social networking systems by expressing their interests in these concepts on web pages on different domains external to the social networking system. The amount of information gathered from users is staggering—information describing interests in sports, music, movies, and the like. Social networking systems have lacked tools to enable advertisers of products to utilize user trends in conjunction with their advertisements.

Specifically, the information available on social networking systems about users' interests and current locations has not been analyzed to predict user trends for use with advertisements. Information about users' trends based on a previous history of user behavior, including a viewing user's connections' trends, is very valuable to advertisers that seek to influence users to click on ads, drive traffic, and increase engagement with products, brands, venues, and the like. However, existing systems have not provided efficient mechanisms of using user trends for targeting advertisements.

SUMMARY

An online system, such as a social networking system, may determine user trends and identify actions to be taken by users that may help optimize revenue for an advertiser. A social networking system may generate offers for an advertiser based on the user trends, user characteristics, and claims about users where the offers include actions determined by the social networking system that users may take to help optimize revenue for advertiser. Venues may also sell ad space, ad inventory, and real-time customer data to advertisers through a social networking system.

Figure 1:
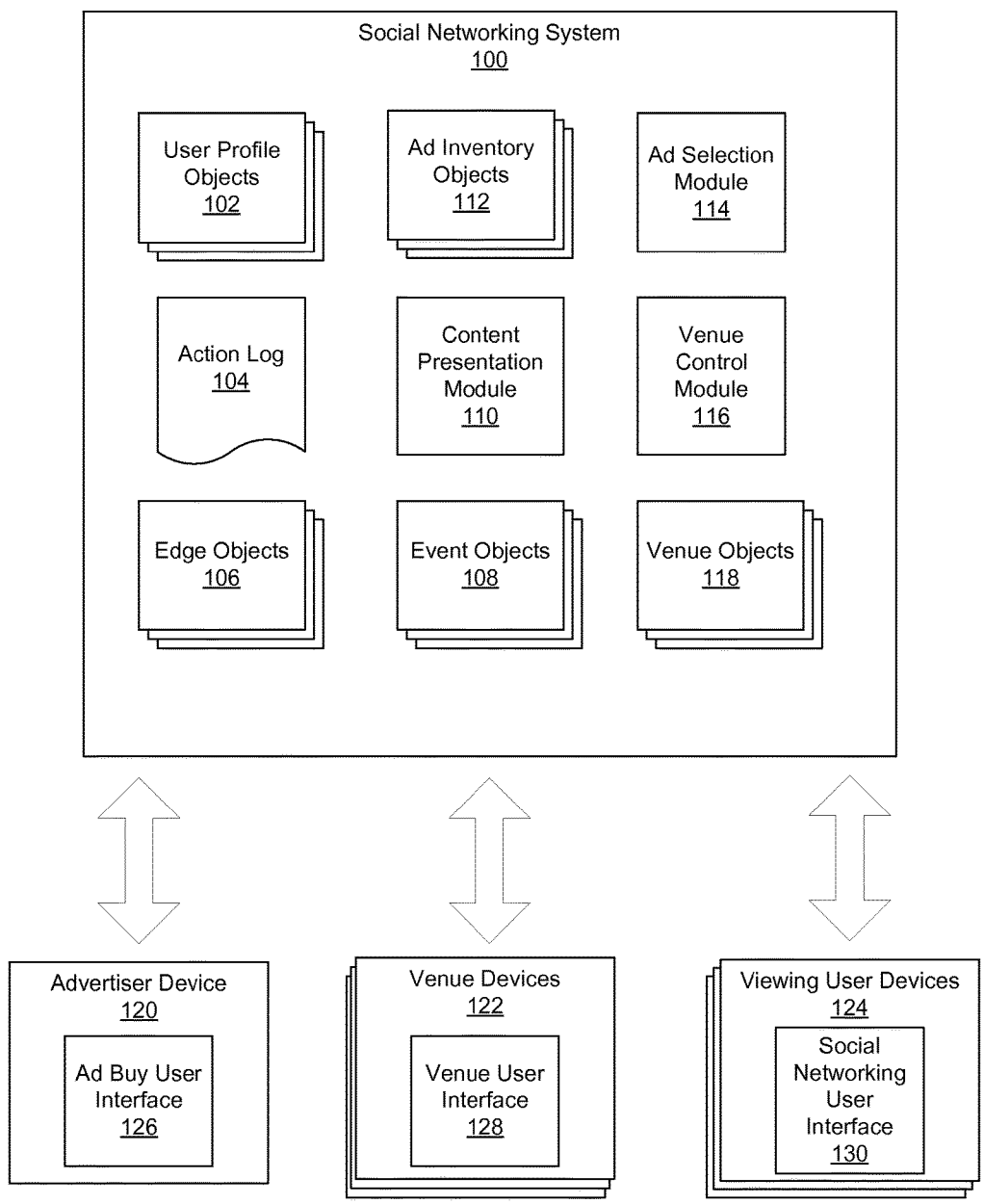
FIG. 1 is high level block diagram illustrating a process of sponsoring venues for targeting users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a web page about a particular bar or restaurant. The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. patent application Ser. No. 13/239,340 filed on Sep. 21, 2011, which is hereby incorporated by reference.

A social networking system may enable advertisers to select one or more venues to sponsor or otherwise subsidize. A listing of venues may be provided through an application programming interface (API) or through a user interface on the social networking system. In one embodiment, advertisers may bid on the venues in an auction. In another embodiment, a venue may be "bought" by an advertiser for a particular asking price. After a venue is bought or won in an auction by an advertiser, the advertiser may be provided with one or more controls over one or more environmental aspects of the venue. For example, the advertiser may select one or more music tracks in a music playlist being played at the venue. Other example controls over environmental aspects of the venue include, but are not limited to, playing a specific song, album, or music genre at the venue, changing a TV channel at the venue, selecting a predefined drink special, generating a redeemable coupon at the venue, and subsidizing transport to the venue (e.g., a taxi ride). After controlling an environmental aspect of the venue, the advertiser may select an advertisement to provide to people at the venue, including users of the social networking system located at the venue.

FIG. 1 illustrates a high-level block diagram of a process of sponsoring venues for targeting users of a social networking system, in one embodiment. A social networking system 100 includes user profile objects 102, an action log 104, edge objects 106, event objects 108, a content presentation module 110, ad inventory objects 112, an ad selection module 114, a venue control module 116, and venue objects 118 that may be used by the social networking system 100 to enable advertisers to sponsor venues for targeting users. An advertiser may use an advertiser device 120, such as a computer, a mobile device, or other user device used to connect to the social networking system 100, to access a listing of potential venues to bid on and/or "purchase" for the purposes of targeting ads to people at the venues. A listing of selectable venues may be displayed in an ad buy user interface 126 on the advertiser device 120. The listing of selectable venues may be provided by the ad selection module 114. The ad selection module 114 may manage the availability of venues, represented by venue objects 118 in the social networking system 100, for being purchased or otherwise sponsored by advertisers. Ad inventory objects 112 may represent available ad inventory to be displayed in the social networking system 100 as well as on other systems external to the social networking system 100.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a" and/or "102b" in the figures). Only three user profile objects 102 are shown in FIG. 1 in order to simplify and clarify the description.

Through the ad buy user interface on the advertiser device 120, an advertiser may purchase a particular venue and select one or more controls of environmental aspects of the particular venue. A venue control module 116 provides to an advertiser device 120 access to one or more environmental controls of a selected venue. An example environmental control may include the ability to change channels on televisions located at the particular venue. An advertiser may purchase this TV channel changing ability at a particular venue, such as changing the channel to the Major League Baseball World Series at a local bar. The venue control module 116 may identify that the particular venue has offered the TV channel changing ability as indicated in the venue object 118 for the particular venue. Other environmental controls that may be offered for purchase by advertisers may include creating drink specials, generating redeemable coupons, creating a theme night at the venue such as "Ladies night," sponsoring taxi rides to pizza joints that originate at bars after midnight, and playing music at a bar, including playing a particular playlist, radio station, song, album, artist, music genre, and so on.

Information about environmental controls for venues may be inputted by venue owners through venue devices 122 using a venue user interface 128 operating on each venue device 122, in one embodiment. In another embodiment, venue owners may enable advertisers to exert control over specified environmental controls through venue devices 122 connected to the social networking system 100 through an application programming interface (API). In one embodiment, venue owners may report information about people that are currently located at a particular venue, represented by a venue object 118, through one or more venue devices 122 at the particular venue. For example, a venue owner of a restaurant may be able to estimate the number of patrons at the restaurant based on an electronic hostess and/or reservation system. As a result, the venue owner may be able to "sell" the audience that includes the current patrons of the restaurant as potential ad inventory. An advertiser purchasing that current audience located at the venue may have control over a special dessert deal at the venue that is offered to users of the social networking system 100 that install a particular application being promoted by the advertiser, for example.

Venue owners may be provided other ways to input information about controllable environmental aspects of venues. A social plug-in installed on an external website for the particular venue may be used to provide information and access to one or more controls of one or more environmental aspects of the particular venue represented by a venue object 118. For example, an environmental control may be controlled from a venue device 122 that may connect over a network at the venue to access the environmental control, such as changing the TV channels. A social plug-in may be installed on a website that may also control the ability to change TV channels at the venue.

After an advertiser buys a particular venue, or wins an auction for the particular venue by placing a highest bid, the advertiser may target advertisements to people at the venue, including users of the social networking system 100 that may be located at or near the venue. A content presentation module 110 may provide various types of content to viewing user devices 124 in a social networking user interface 130 operating on each viewing user device 124, including advertisements selected by an advertiser that purchased a venue where the viewing user devices 124 are currently located.

In one embodiment, events, represented by event objects 108, may be used by users of the social networking system 100 to create plans of where users will be attending various functions at venues represented by venue objects 118. For example, a sizable group of users may attend an event being hosted at a particular karaoke bar for a birthday party. The event object 108 for the event may be associated with the venue object 118 for the karaoke bar. This information may be provided to advertisers that may potentially buy the karaoke bar for the time period during which the large group of users will be attending the birthday party event. In this way, valuable information about the current audience of the karaoke bar during the times listed in the birthday party event object 108 may be provided by one or more users of the social networking system 100. Venue owners may enable this information to be accessible by potential advertisers through an ad buy user interface 126 operating on an advertiser device 120.

Continuing the previous example with the birthday party event at the karaoke bar, an advertiser may also receive various aggregated information about the users that are attending the birthday party event based on user profile objects 102 associated with the users that RSVP'd to the event object 108 on the social networking system 100. Along with demographic information and interests, advertisers may also be provided with information about strengths of relationships and affinities for nodes in the social networking system 100 through a plurality of edge objects 106 associated with the users attending the party. Further, behavior information may be aggregated based on actions recorded in the action log 104 for users attending the party.

This wealth of information may result in highly targeted advertisements being provided to the users attending the birthday party event. For example, after the venue had been identified as hosting the birthday party event, the social networking system 100 may provide information about the users attending the party in aggregate, such as 81 people attending the party that are between the ages of 25-45 and that have higher than average affinity scores for a volunteer arts organization. Additionally, the social networking system 100 may determine that over 50% of the users invited to the event have an interest in figure skating as indicated as an interest in user profile objects 102 and high affinity scores for edge objects 106 for figure skating. An advertiser for a touring musical ice skating show may identify that this highly targeted group may be easily influenced into purchasing tickets to the show at group rates. As a result, the advertiser may "buy" the venue and provide subsidized drink specials that may be redeemed by viewing a video advertisement for the tour on the users' mobile devices through the social networking system 100. The drink special, a controllable environmental aspect of the venue, may appear as a pop-up notification on an application operating on mobile devices, in one embodiment.

Another controllable environmental aspect of the venue may include controlling one or more screens at the karaoke bar, such that the advertiser may offer a drink special if someone sings a song from the touring musical. The venue owner may have programmatically connected the karaoke DJ booth to the social networking system 100, in one embodiment, such that the venue control module 116 may access that data and verify that the song was sung at the karaoke bar. In another embodiment, a venue device 122 may enable the venue owner to report to the advertiser that the requested action was performed through the venue user interface 128. As a result, the advertiser may take advantage of one or more controls for environmental aspects of the karaoke bar to convey the commercial message of the advertisement for the touring musical ice skating show to the highly targeted audience of users attending the birthday party event.

In one embodiment, a social networking system 100 may generate ad inventory objects 112 based on event objects 108 where it is determined that a highly targeted audience may be available for purchase. Instead of "buying" the whole time period of the birthday party event, the advertiser may purchase a defined time slot or a percentage of ad spots executed during the time period of the birthday party event. In this way, multiple advertisers may bid for access to the current audience at the venue. In another embodiment, ad inventory objects 112 for one or more venues corresponding to venue objects 118 may generated by the social networking system 100 based on information received from users of the social networking system 100 through check-in events, RSVPs to various event objects, and geographic location data of users of the social networking system 100 accessing mobile devices with Global Positioning System (GPS) data.

System Architecture

Figure 2:
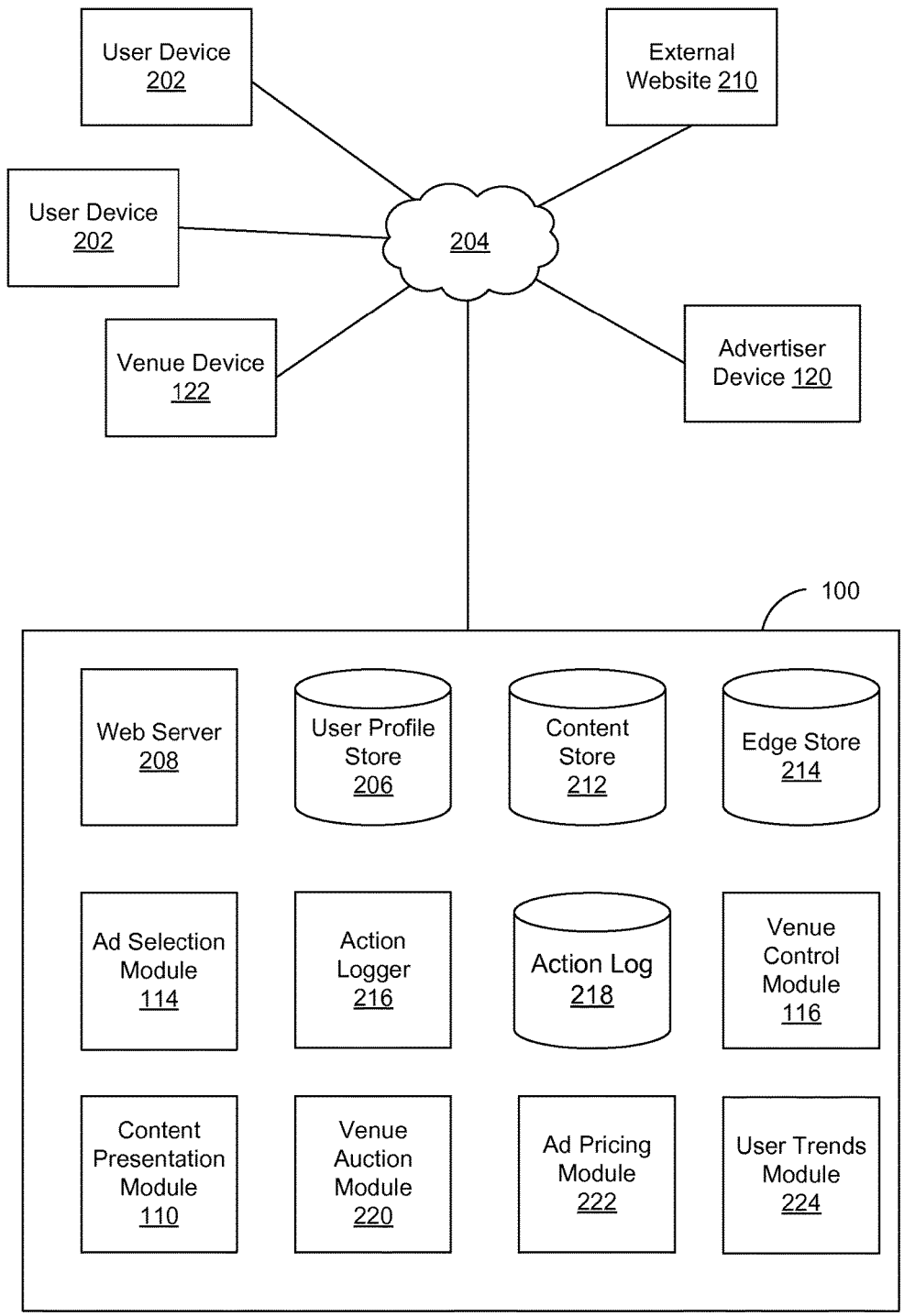
FIG. 2 is a network diagram of a system for sponsoring venues for targeting users of a social networking system, showing a block diagram of the social networking system, in accordance with an embodiment of the invention.

FIG. 2 is a high level block diagram illustrating a system environment suitable for sponsoring venues for targeting users of a social networking system, in accordance with an embodiment of the invention. The system environment comprises one or more user devices 202, the social networking system 100, a network 204, one or more third-party websites 210, an advertiser device 120, and a venue device 122. In alternative configurations, different and/or additional components may be included in the system environment 100. The embodiments described herein can be adapted to online systems that are not social networking systems.

The user devices 202 comprise one or more computing devices capable of receiving user input as well as transmitting and/or receiving data via the network 204. In one embodiment, a user device 202 is a conventional computer system, such as a desktop or laptop computer. In another embodiment, a user device 202 may be a device having computer functionality, such as a personal digital assistant (PDA), mobile telephone, smart-phone or similar device. A user device 202 is configured to communicate via the network 204. In one embodiment, a user device 202 executes an application allowing a user of the user device 202 to interact with the social networking system 100. For example, a user device 202 executes a browser application to enable interaction between the user device 202 and the social networking system 100 via the network 204. In another embodiment, a user device 202 interacts with the social networking system 100 through an application programming interface (API) that runs on the native operating system of the user device 202, such as IOS® or ANDROID™.

The user devices 202 are configured to communicate via the network 204, which may comprise any combination of local area and/or wide area networks, using both wired and wireless communication systems. In one embodiment, the network 204 uses standard communications technologies and/or protocols. Thus, the network 204 may include links using technologies such as Ethernet, 802.11, worldwide interoperability for microwave access (WiMAX), 3G, 4G, CDMA, digital subscriber line (DSL), etc. Similarly, the networking protocols used on the network 204 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 204 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 210 may be coupled to the network 204 for communicating with the social networking system 100.

FIG. 2 is an example block diagram of an architecture of the social networking system 100. The social networking system 100 includes a user profile store 206, a content store 212, an action logger 216, an action log 218, an edge store 214, a web server 208, a content presentation module 110, an ad selection module 114, a venue control module 116, a venue auction module 220, an ad pricing module 222, and a user trends module 224. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 206. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 206 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile, represented as a user profile object 102 in the user profile store 206, may also maintain references to actions by the corresponding user performed on content items in the content store 212 and stored in the action log 218.

While user profiles in the user profile store 206 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 212 stores content objects representing various types of content. Examples of content represented by an object include a page post, a status update, a photo, a video, a link, a shared content item, a gaming application achievement, a check-in event at a local business, a brand page, or any other type of content. Event objects 108, ad inventory objects 112, and venue objects 118 may be stored as content objects in the content store 212. Objects may be created by users of the social networking system 100, such as status updates, photos tagged by users to be associated with other objects in the social networking system, events, groups or applications. In some embodiments, objects are received from third-party applications or third-party applications separate from the social networking system 100. Content "items" represent single pieces of content that are represented as objects in the social networking system 100. Users of the social networking system 100 are encouraged to communicate with each other by posting text and content items of various types of media through various communication channels, increasing the interaction of users with each other and increasing the frequency with which users interact within the social networking system.

Social networking system users transmit text content to each other using a variety of communication types. The text content is stored in the content store 212 and associated with the user sending the text content and the one or more users receiving the text content. A communication type may be associated with the stored text content. Examples of communication types include status updates, notes, comments, posts and messages. A status update is text data provided by a user that is included in the user's user profile and as stories in news feeds presented to other users connected to the user. Similarly, a note is longer or more detailed text data provided by the user that is included in the user's user profile and as stories in news feeds presented to other users connected to the user. A post is text that a user places on a profile of an additional user connected to the user; a post is typically visible to users connected to the user and/or users connected to the additional user. Comments are data posted based on previously posted content, such as status updates, notes or actions previously taken by a user. Messages are text sent from a user to another user; messages are visible to the user sending the message and the user receiving the message.

Communication types differ from each other in a variety of ways. For example, messages have smaller, more carefully chosen audiences than status updates. As another example, notes are typically longer than other communication types. These differences allow messages having different communication types to provide different information about personality characteristics of users.

The action logger 216 receives communications about user actions on and/or off the social networking system 100, populating the action log 218 with information about user actions. Such actions may include, for example, adding a connection to another user, sending a message to another user, uploading an image, reading a message from another user, viewing content associated with another user, attending an event posted by another user, among others. In some embodiments, the action logger 216 identifies interaction between a social networking system user and a brand page within the social networking system 100, which communicates targeting criteria associated with content on the brand page to a content selector to customize content from the brand page. In addition, a number of actions described in connection with other objects are directed at particular users, so these actions are associated with those users as well. These actions are stored in the action log 218.

The action log 218 may be used by the social networking system 100 to track user actions on the social networking system 100, as well as external website that communicate information to the social networking system 100. Users may interact with various objects on the social networking system 100, including commenting on posts, sharing links, and checking-in to physical locations via a mobile device, accessing content items or other interactions. Information describing these actions is stored in the action log 218. Additional examples of interactions with objects on the social networking system 100 included in the action log 218 include commenting on a photo album, communications between users, becoming a fan of a musician, adding an event to a calendar, joining a groups, becoming a fan of a brand page, creating an event, authorizing an application, using an application and engaging in a transaction. Additionally, the action log 218 records a user's interactions with advertisements on the social networking system 100 as well as other applications operating on the social networking system 100. In some embodiments, data from the action log 218 is used to infer interests or preferences of the user, augmenting the interests included in the user profile and allowing a more complete understanding of user preferences.

The action log 218 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 218 records data about these users, including webpage viewing histories, advertisements that were engaged, purchases made, and other patterns from shopping and buying.

In one embodiment, an edge store 214 stores the information describing connections between users and other objects on the social networking system 100 in edge objects 106. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system.

The edge store 214 stores edge objects 106 that include information about the edge, such as affinity scores for objects, interests, and other users. Affinity scores may be computed by the social networking system 100 over time to approximate a user's affinity for an object, interest, and other users in the social networking system 100 based on the actions performed by the user. A user's affinity may be computed by the social networking system 100 over time to approximate a user's affinity for an object, interest, and other users in the social networking system 100 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 214, in one embodiment. In some embodiments, connections between users may be stored in the user profile store 206, or the user profile store 206 may access the edge store 214 to determine connections between users.

The web server 208 links the social networking system 100 via the network 204 to the one or more user devices 202, as well as to the one or more third party websites 130. The web server 208 serves web pages, as well as other web-related content, such as Java, Flash, XML and so forth. The web server 208 may provide the functionality of receiving and routing messages between the social networking system 100 and the user device 202, for example, instant messages, queued messages (e.g., email), text and SMS (short message service) messages, or messages sent using any other suitable messaging technique. A user may send a request to the web server 208 to upload information, for example, images or videos that are stored in the content store 212. Additionally, the web server 208 may provide API functionality to send data directly to native client device operating systems, such as IOS®, ANDROID™, WEBOS® or RIM.

An ad selection module 114 provides information about available venues for purchase, a listing of controllable environmental aspects of the venues, and a plurality of information items about the audiences located at the venues. Information about available venues for purchase by advertisers may be received from the venue auction module 220. The venue control module 116 may provide information about the controllable environmental aspects of the venues. A content presentation module 110 may provide an advertisement selected through the ad selection module 114 to users of the social networking system 100.

A venue auction module 220 provides a bidding auction for advertisers to purchase venues for advertising purposes. In one embodiment, the highest bidding advertiser may win the bidding auction for a particular venue. In another embodiment, an advertiser may purchase a venue by agreeing to pay a predetermined "buy" price. In yet another embodiment, the venue auction module 220 may enable advertisers to bid on events at venues as defined by event objects 108 in the social networking system 100. One or more advertisers may purchase an event attended by a plurality of users of the social networking system 100. The venue auction module 220 may retrieve information about users of the social networking system 100 that are or will be located at venues, such as demographic information, education level, number of connections on the social networking system 100, interests, applications installed, and so on. The venue auction module 220 may also set an asking price for venues based on venue popularity, number of people at the venue, relevance of interests of users located at the venue to the advertisements being provided the advertiser, and so on.

An ad pricing module 222 may be used to generate pricing of "buying" venues for targeting advertisements. The ad pricing module 222 may receiving information about users of the social networking system 100 that are located at a particular venue, such as whether the users of the social networking system 100 located at the venue are connected to each other, the level of their connection, and/or whether the users have similar interests in the social networking system 100. The ad pricing module 222 may provide an asking price for venues to the venue auction module 220, in one embodiment. In another embodiment, the ad pricing module 222 may rely on a prediction model to determine a value of an advertisement to an advertiser based on users located at a particular venue. In a further embodiment, an advertisement may be given a higher value by the ad pricing module 222 for a particular user based on whether the user is located near or is with close connections of the particular user (closer friends based on affinity scores). In yet another embodiment, an advertisement may be given a higher value by the ad pricing module 222 for a particular user based on whether the user is located near or is with connected users that have an affinity score for a brand relevant to the advertisement higher than a predetermined threshold.

A user trends module 224 provides an analysis of user behavior based on actions performed in the social networking system 100. A user trend may be defined as a pattern of user behavior that may be predicted by the social networking system 100 after a particular action is performed by a user based on a past history of actions performed after the particular action is performed by the user. For example, people may go to a pizzeria or other late night restaurant after drinking alcohol at one or more bars after 10 pm on weeknights and/or weekends. The user behavior may be captured as actions within the social networking system 100. User trends may determined by the user trend module 224 on an ad hoc basis. In one embodiment, the user trends module 224 may determine patterns in user behavior based on actions recorded in the action log 218. In another embodiment, advertisers may input query user behaviors via the user trends module 224 to determine which further actions in the social networking system 100 are performed as a consequence of initial actions. For example, an advertiser may query check-in events at movie theaters by women aged 18-35. The user trends module 224 may return, in aggregate, a plurality of types of check-in events that were performed after the check-in events at the movie theaters. Based on these types of check-in events, the user trends module 224 may predict what those users may tend to do after performing the check-in event at the movie theater based on a past history of check-in events.

Other types of initial user actions and predicted actions may be received and determined by the user trends module 224. For example, during college football season, a plurality of users may communicate on the social networking system 100 about their favorite college football teams. While watching various college football games, users may express their excitement over certain teams winning or losing, such as Stanford upsetting Oregon. As a result of a win, users may then celebrate by grabbing drinks at a local sports bar. As a result, a user trend may be identified such that users that post status messages about colleges during college football season may be targeted for advertisements about drink specials and/or special viewing parties for college football fans. In one embodiment, the user trends module 224 may independently identify this user trend. In another embodiment, the user trends module 224 may be queried by advertisers to identify patterns in user behavior that may constitute user trends used for user targeting. Patterns in user behavior may be identified based on users performing the same action, in one embodiment. In another embodiment, patterns in user behavior may be identified based on user attributes, such as matching based on graph attributes or fuzzy matching users into "crowds" that tend to behave in user trends. By identifying user trends, advertisers may be provided with valuable information in shifting or otherwise influencing crowds of users to perform an action that they would be more likely to perform regardless of targeted advertisements.

Sponsoring Venues for Targeting Advertisements on a Social Networking System

Figure 3:
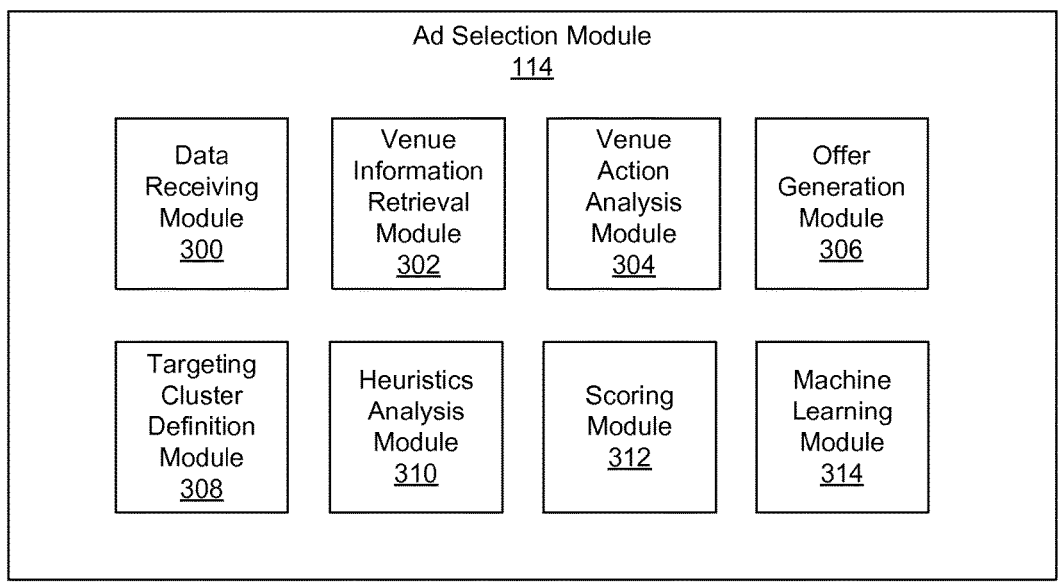
FIG. 3 is a high level block diagram illustrating an ad selection module that includes various modules for selecting an advertisement based on sponsored venues, in accordance with an embodiment of the invention.

FIG. 3 illustrates a high level block diagram of the ad selection module 114 in further detail, in one embodiment. The ad selection module 114 includes a data receiving module 300, a venue information retrieval module 302, a venue action analysis module 304, an offer generation module 306, a targeting cluster definition module 308, a heuristics analysis module 310, a scoring module 312 and a machine learning module 314. These modules may perform in conjunction with each other or independently to sponsor one or more venues for targeting advertisements.

A data receiving module 300 interfaces with external websites 210, venue devices 122, and advertiser devices 120 to receive and retrieve information about venues, users located at the venues, and advertisements displayed to the users of the social networking system 100. This information may include availability of venues, identifying information of one or more advertisers purchasing venues, identifying information of venues, a listing of environmental aspects that may be controlled by venue-purchasing advertisers for each venue, information items about audiences located at venues received in real-time, and so on. In one embodiment, the data receiving module 300 may process the information retrieved from external websites 210, venue devices 122, and advertiser devices 120 in a batch process asynchronously from the ad selection module 114.

A venue information retrieval module 302 may retrieve a plurality of information items about venues, including users of the social networking system 100 located at the venues, environmental aspects of the venues that may be controlled by purchasing advertisers, and other information about venues that may be provided by venue owners through venue devices 122. For example, a venue owner may indicate that the type of venue is a bar, the address of the bar, an average number of customers at the venue per week, the capacity of the venue, and so forth. The social networking system 100 may provide other information about a venue, such as information about users that have performed check-in events at the venue, users that have attended events at the venue, and users that have mentioned the venue in user-generated content posted on the social networking system 100.

A venue action analysis module 304 may determine the effect on advertisement conversions by advertiser actions at venues. After "buying" a venue, advertisers may control one or more aspects of the venue, such as creating drink specials, generating redeemable coupons in store, changing TV channels, playing a music album at the venue, and so on. After performing an advertiser action, the advertiser may provide one or more advertisements to the users at the venue. A model may be generated to analyze which advertiser actions produce positive outcomes, such as user conversions on advertisements, click-throughs on advertisements, new connections to the advertiser's page on the social networking system, and so on.

In one embodiment, regression analysis may be used to determine a score that indicates whether an action at a venue is a good fit with a desired outcome for an advertisement displayed to users of the social networking system 100. This "fit" test may be based on other controllable environmental aspects of venues in relation to the advertisement. A curve fit, or best fit, yields a number from 0 to 1 that can be used as an accuracy measurement of the selection of the particular environmental aspect of a venue. Regression analysis, in one embodiment, may also be used to adapt the model to include or exclude different venue actions that are determined to be relevant or not relevant to a particular advertisement for a particular venue based on machine learning techniques and heuristics analysis of the information retrieved about the advertisement, the viewing user, and other users connected to the viewing user on the social networking system 100.

An offer generation module 306 determines a customized offer for providing to a particular user at a venue by an advertiser that maximizes a value to the advertiser. The offer generation module 306 may generate a particular offer for the venue based on user trends for users located at the venue. For example, the offer generation module 306 may determine that users of the social networking system 100 tend to go to a restaurant after checking-into a bar after 11 PM. As a result, a customized offer for providing a drink special at bars located near a late night restaurant may be provided by the offer generation module 306 to an advertiser for the late night restaurant for use as a targeted advertisement.

An offer generation module 306 may also rely on a user trends module 224 to determine an offer for a plurality of users based on other types of actions, aside from being located at a particular venue, they recently performed on or outside of the social networking system 100. For example, the user trends module 224 may identify users that have expressed an interest in the Hunger Games book series and have watched the movie adaptation of the first installment. Based on the initial action of watching the first Hunger Games movie, the user trends module 224 may predict that the users will provide a rating of the movie on Rotten Tomatoes or another user review website. A competitor movie review website or application on the social networking system 100 may be provided with a customized offer from the offer generation module 306 to rate the Hunger Games movie on the competitor movie review website or application. In this way, the advertisement takes advantage of the user trend to review the movie on Rotten Tomatoes and instead directs the users to the competitor's site.

In one embodiment, an offer generation module 306 provides an optimized offer for an advertiser based on the type of product or service being promoted or sponsored on the social networking system 100. An advertiser may select the type of product or service being promoted or sponsored and select one or more keywords that may describe the advertisement. Based on that information, the offer generation module 306 may generate a certain discount, deal, offer, or promotion for any type of product or service that may or may not be related to the advertiser's product or service. For example, an advertiser for a dance club promoting a "ladies night" may be provided an optimized offer that provides a free cab ride for female users to the dance club redeemable by female users within a certain distance from the dance club. In this way, more female users may be more inclined to go to the ladies night at the dance club.

A targeting cluster definition module 308 may define a targeting cluster based on a generated offer determined by the offer generation module 306. For example, the targeting cluster defined in the offer for the free cab ride to the promoted ladies night at the dance club may include women users aged 21-40 that are currently located or live near the geographic location of the dance club, where near is defined by the advertiser's willingness to pay more or less for the cost of the free cab rides. As a result, the size of the targeting cluster may be larger or smaller based on the advertiser's advertising budget, in one embodiment. In another embodiment, the targeting cluster definition module 308 may include targeting criteria defined by an advertiser. In one embodiment, the targeting cluster definition module 308 may optimize the targeting criteria defined by an advertiser based on the advertiser opting for a customized offer generated by the offer generation module 306. In that case, the targeting cluster definition module 308 may redefine the targeting criteria to best fit the needs of the advertiser based on user trends, advertising budget, and selected targeting criteria.

A heuristics analysis module 310 operates independently and asynchronously from the other modules in the ad selection module 114. The heuristics analysis module 310 performs various steps to gather information from the social networking system 100. For example, an action log includes actions that users perform on the social networking system. The heuristics analysis module 310 may be used to analyze the level of communications activity on the social networking system to determine whether those communications include certain keywords, such as "Justin Bieber," that may indicate a topic of the communication activity. Using these heuristics, relevant advertiser actions controlling one or more environmental aspects of a particular venue based on the communication activity may be selected for a particular advertisement for display to users located at the particular venue. Other uses of heuristics analysis may include identifying user trends based on user behavior in the social networking system 100 and on other systems external to the social networking system 100, optimizing a customized offer generated by the offer generation module 306 to maximize an expected value based on user behavior, and identifying proximate services that may be relevant to achieving goals of an advertiser based on the type of product or service being promoted.

A scoring module 312 generates one or more scoring models for scoring advertisements for display in conjunction with advertiser actions controlling one or more environmental aspects of a particular venue to viewing users of the social networking system 100 on external websites 210 as well as the social networking system 100. The scoring module 312 may generate different types of scoring models for determining a score for different types of advertisements, such as advertisements for a particular product, advertisements for other venues, advertisements for brands, and so on. Weights, or coefficients, may be assigned to one or more factors in a scoring model such that a particular factor may have more weight than another. Factors may include the number of different actions that may be performed on the controllable environmental aspects of a venue, the impact of the actions performed based on feedback from the people at the venue, such as redemption of coupons offered, drink specials ordered, and so forth, and the type of venue where the users are located. The scoring module 312 operates in conjunction with the other modules of the ad selection module 114 to determine these weights, in one embodiment. In one embodiment, the weights are preselected by advertisers. In another embodiment, the social networking system 100 may initially determine the weights.

In a further embodiment, the scoring module 312 selects which factors to use in a particular scoring model for determining one or more scores advertisements to be provided to users located at a particular venue. For example, a list of keywords describing one or more controllable actions at the particular venue may be received by the data receiving module 300, such as "Budweiser," "Bud Light," "Miller Lite," and "draft beer." As a result, relevant interests associated with the keywords may be retrieved from user profile objects 102 and edge objects 106 and may be used in determining one or more scores for a plurality of advertisements for a particular advertiser. A certain keyword, such as "Bud Light," may be assigned a greater weight by an advertiser such that the score for the keyword may be higher than the scores for the other keywords. However, affinity scores for other keywords and for other users having interest relevant to the other keywords may generate higher scores for those other keywords. In addition, the user trends module 224 may provide information about user trends for users located at a particular venue. For example, an advertiser for a pizzeria may "buy" a nearby bar venue and the scoring module 312 may provide scores for a plurality of advertisements at the pizzeria, such as a buy one slice, get one free slice limited offer, a drink special discount at the bar, changing music at the bar, changing TV channels, and displaying advertisements for the pizzeria at the bar. For a particular user, a scoring module 312 may determine that the user is very interested in Bud Light and that other users located near the bar are also very interested in Bud Light. The advertiser for the pizzeria may be provided with a recommendation to provide a customized offer to the user for a drink special that includes a free Bud Light after buying 2 Bud Lights. In this way, the scoring module 312 has highly scored an advertisement or offer for Bud Light to be subsidized by the advertiser for the pizzeria because the user trends module 224 may indicate that the particular user goes to the pizzeria after drinking multiple beers.

The scoring module 312 may, in another embodiment, determine one or more scores for a set of advertisements using a scoring model trained on user feedback received from users receiving the advertisements using machine learning methods used by the machine learning module 314 as well as through heuristics about selecting the set of advertisements received from the heuristics analysis module 310, in one embodiment. The selection of relevant advertisements may be manually selected by an advertiser, in another embodiment, as received by the data receiving module 300. In a further embodiment, relevant advertisements may be selected for scoring by one or more scoring models based on user feedback that affirms or disaffirms a previously selected advertisement for a particular venue.

Different factors may be included in the one or more scoring models used for determining one or more scores for the one or more advertisements for providing to a viewing user of a social networking system 100 located at a venue. Such factors may include, in one embodiment, analyzing attributes of the advertisement, such as genre, concept, and keywords, analyzing attributes of the viewing user, such as web browsing history, affinity scores of interests and connections, and other advertisements clicked upon, as well as analyzing attributes of other users connected to the viewing user. For example, a set of users may be known to influence a particular viewing user, such that when the set of users perform an action or post the action on the social networking system 100 through a communication channel, the viewing user is more likely to interact with the action or post than other user interactions on the social networking system 100. This set of influencing users may be identified in the user profile object 102 of the viewing user, and as a result, social context information received from this set of influencing users that is relevant to the advertisement may be weighted more heavily by the scoring module 312, in one embodiment. Determining a set of influencing users is further described in "Targeting Stories Based on Influencer Scores," U.S. patent application Ser. No. 13/429,126, filed on Mar. 23, 2012, which is hereby incorporated by reference in its entirety.

A machine learning module 314 may be used in the ad selection module 114 to refine one or more scoring models defined in the scoring module 312. In one embodiment, a social networking system 100 uses a machine learning algorithm to analyze user feedback to retrain the scoring model. The scoring model may be refined to include more or less factors for determining the scores of advertisements for use in conjunction with advertiser actions at a particular venue, and the weights assigned to each factor, or coefficients, may also be adjusted based upon the user feedback. The user feedback may include ignoring the advertisement by clicking on an 'X' on the advertisement, clicking on the advertisement, sharing the advertisement or customized offer, mentioning the brand in a positive sentiment in a content item posted by the user after receiving the advertisement, and so forth.

Figure 4:
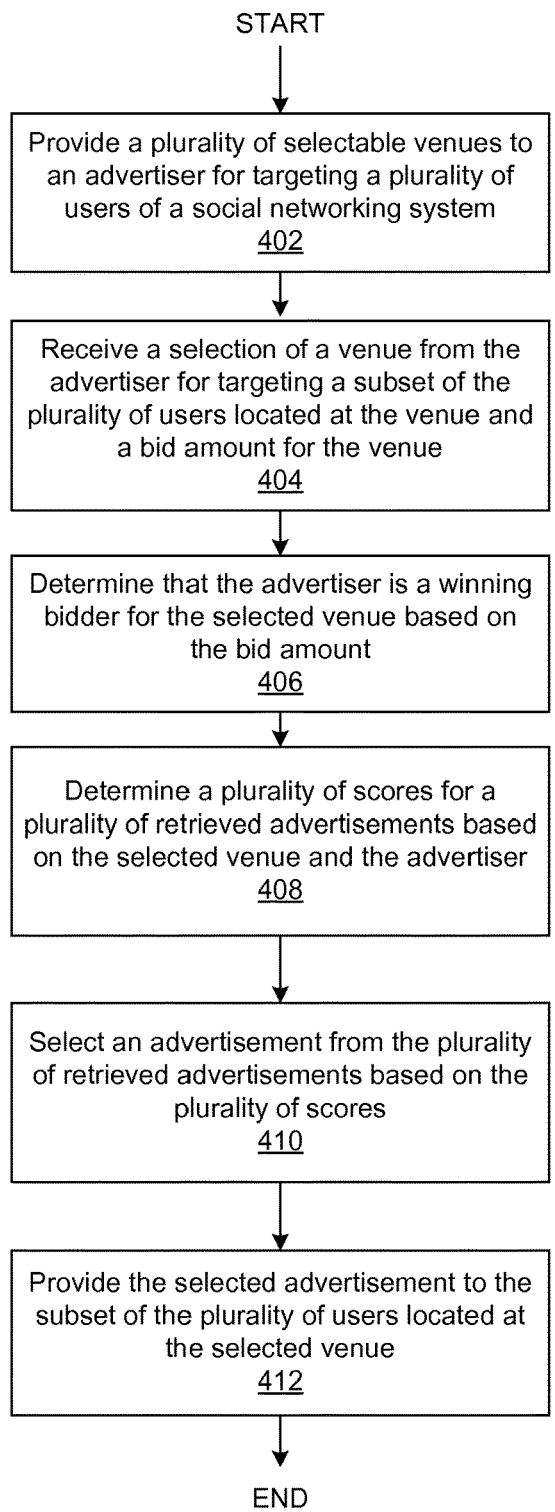
FIG. 4 is a flowchart of a process of sponsoring venues for targeting users of a social networking system, in accordance with an embodiment of the invention.

FIG. 4 is a flowchart of a process of sponsoring venues for targeting users of a social networking system, in accordance with an embodiment of the invention. A plurality of selectable venues is provided 402 to an advertiser for targeting a plurality of users of a social networking system. The plurality of selectable venues may be provided 402 in a user interface on the social networking system 100, in one embodiment. The plurality of selectable venues may be provided 402 through an application programming interface (API), in another embodiment. In yet another embodiment, the plurality of selectable venues may be provided 402 on a user interface on a system external to the social networking system 100, such that the user interface is communicatively coupled to the social networking system 100. The social networking system 100 may include identifying information of the one or more venues being provided 402 by retrieving the identifying information from venue objects 118 in the social networking system 100 representing the plurality of selectable venues, in one embodiment. In another embodiment, the social networking system 100 may provide a type of venue for each of the plurality of selectable venues. In a further embodiment, a link, referral, or other identifying information of a page on the social networking system 100 or external to the social networking system 100 may be provided 402 for each of the plurality of selectable venues.

Next, a selection of a venue and a bid amount for the venue are received 404 from the advertiser for targeting a subset of the plurality of users located at the venue. The selection of the venue and the bid amount for the venue may be received 404 based on a selection of links in a user interface on the social networking system 100, in one embodiment. The selection of the venue and the bid amount for the venue may be received 404 through an API connected to the social networking system 100, in another embodiment. In a further embodiment, the selection of the venue and the bid amount for the venue may be separately received, such as through a bid auction for venues and a selection of the venue through an interface connected to the social networking system 100.

After a selection of the venue and the bid amount for the venue are received 404, the social networking system may determine 406 that the advertiser is a winning bidder for the selected venue based on the bid amount. In one embodiment, the advertiser is the winning bidder based on the bid amount being the highest bid amount received for the selected venue. In another embodiment, the advertiser is a winning bidder among other winning bidders for the selected venue based on the bid amount meeting the minimum asking price for the venue. In that case, targeted advertising at the venue may be divided among the winning bidders. In a further embodiment, the social networking system may determine 406 that the advertiser is a winning bidder for the selected venue based on the bid amount securing an advertising slot among a limited number of advertising slots for the selected venue.

A plurality of scores are then determined 408 for a plurality of retrieved advertisements based on the selected venue and the advertiser. Scores may be generated by one or more scoring models for the plurality of advertisements, where each advertisement is scored by a scoring model to generate a score. For example, a score may be generated for a particular brand of digital camera being advertised, based on the selected venue, received user trends for users located at the venue, a plurality of interests expressed by users located at the venue relevant to the advertisement, and the number of connected users located at the venue. A score for the advertisement for the digital camera may be lower than a score for the advertisement for the brand of the digital camera based on weights selected by the advertiser as well as weights determined using machine learning techniques. An advertiser may heavily weight advertisements related to retailers versus brands of digital cameras, for example. As a result, scores for advertisements related to retailers may be higher than scores for advertisements related to digital camera brands. However, a certain brand, such as Panasonic, may be specifically weighted more than retailers based on user feedback received from users clicking on advertisements related to the Panasonic brand. As a result, ads related to Panasonic may score higher than ads to retailers. In one embodiment, one scoring model may be used for generating scores for all types of advertisements. In another embodiment, different scoring models may be used that include different factors based on information retrieved about a viewing user, other users connected to the viewing user on the social networking system 100, the different venues, the different types of venues, and the advertisements.

After the plurality of scores are determined 408 for the plurality of retrieved advertisements, an advertisement is selected 410 from the retrieved plurality of advertisements based on the plurality of scores. The selected ad may be the ad with the highest score, in one embodiment. In another embodiment, the selected ad may be an ad having a score greater than a predetermined threshold for scores. In yet another embodiment, more than one ads may be selected 410 for display based on the plurality of scores for the ads meeting or exceeding a predetermined threshold.

The selected ad is then provided 412 to the subset of the plurality of users located at the selected venue. A request for an ad may be received through an application programming interface (API) request, in one embodiment. As a result, the selected ad may be provided 410 through the same API to the subset of the plurality of users located at the selected venue. In another embodiment, the selected ad is provided 412 to a social context plug-in installed on an external system or external website on which the selected ad is displayed to users of the social networking system 100 located at the selected venue. In a further embodiment, the selected ad is provided 412 to an ad server of the social networking system 100 for providing the selected advertisement for display on a page of the social networking system 100 to the subset of the plurality of users located at the selected venue.

Figure 5:
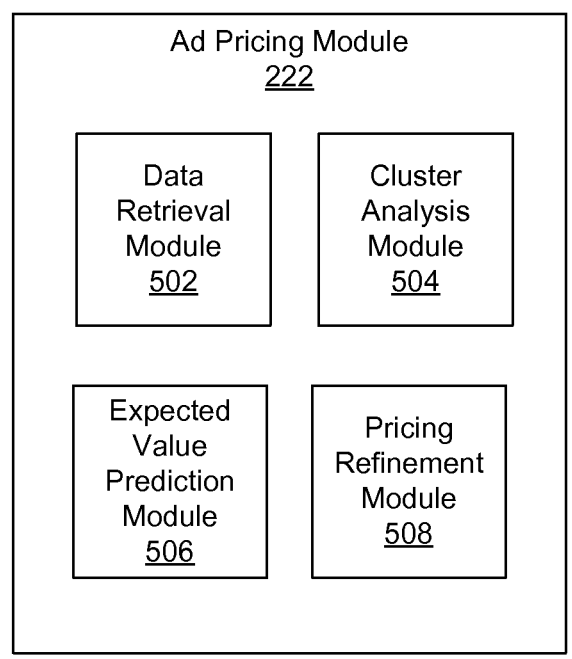
FIG. 5 is a high level block diagram illustrating an ad pricing module that includes various modules for pricing advertisements based on information about users, in accordance with an embodiment of the invention.

FIG. 5 is a high level block diagram illustrating an ad pricing module that includes various modules for pricing advertisements based on information about users, in accordance with an embodiment of the invention. An ad pricing module 222 may include a data retrieval module 502, a cluster analysis module 504, an expected value prediction module 506, and a pricing refinement module 508. These modules may perform in conjunction with each other or independently to determine pricing for advertisements based on information about users.

A data retrieval module 502 of an ad pricing module 222 may retrieve information items for determining a price of an advertisement based on information about a targeting cluster of users for the advertisement. Because a targeting cluster of users may be defined in a multitude of ways, the ad pricing module 222 may determine the price of an ad separately from determining the targeting cluster of users for the advertisement. Additionally, specific pricing structures may become applicable if a targeting cluster of users meets one or more predetermined criteria. The data retrieval module 502 may query user profile objects, edge objects, content objects, action logs, and graph objects for information items relevant to an advertisement. For example, advertisers may highly value users that are currently with connected users for which they have high affinity and also currently located at the same venue. Advertisers may wish to associate their brands with the users and their close friends having a good time. The data retrieval module 502 may retrieve the user connections, affinity scores, current locations, and interests from the social networking system 100 to determine this information for a targeting cluster of users that comprises users that are currently located a particular venue, for example. In a further embodiment, claims made about users in the targeting cluster, such as a claim made about where the users are currently located, may also be retrieved by the data retrieval module 502. Claims are further described in "Evaluating Claims in a Social Networking System," U.S. patent application Ser. No. 13/455,047, filed on Apr. 24, 2012, hereby incorporated by reference.

A cluster analysis module 504 determines an analysis of a targeting cluster for specific metrics for pricing advertisements. Advertisements may target highly valued populations, such as people currently located together having a good time, as described above. The cluster analysis module 504 may receive a targeting cluster of users to analyze whether the targeting cluster of users meets the predetermined threshold metrics for the highly valued populations. Continuing the previous example, the cluster analysis module 504 may generate a model for determining whether a targeting cluster of users comprises a group of close friends currently located together having a good time. Such a prediction model may have predetermined weights on various factors, such as whether the group of users are "close friends" by each user meeting or exceeding a predetermined threshold affinity score for each other user in the group, whether the users are currently with or currently located at the same place as indicated by at least one user of the group of other users through a check-in event or tagging in a content post on the social networking system 100, and the level of positive sentiment extracted from posts generated from the targeting cluster of users on the social networking system 100. In one embodiment, weights for each factor may be received from advertisers. In another embodiment, the weights may be trained by the pricing refinement module 508 based on machine learning methods and user feedback. The cluster analysis module 504 may generate a score that represents how closely a received targeting cluster of users matches, or best fits, characteristics of one or more highly valued populations, as defined by advertisers and/or administrators of the social networking system 100.

In another embodiment, an ad may be worth more if a user is near more friends, more people who have a certain interest, more people who have a high affinity for a brand, or just more people in general. Therefore, an ad system increases the price of serving an ad to a user based on how many other people who fit these criteria are near the user. In that case, the prices of serving ads to users that are alone at a venue may be lower than the prices of serving ads to users that are with several close friends at the venue. The cluster analysis module 504 may determine a score for each of these criteria based on retrieved information about the user.

An expected value prediction module 506 generates an expected value of a targeting cluster of users for advertising purposes. One or more highly valued populations may be assigned one or more expected values by one or more advertisers using a bidding auction process, in one embodiment. In another embodiment, the expected values of highly valued populations may be determined by administrators of the social networking system 100 based on market research. In a further embodiment, the expected values of highly valued populations for targeting advertisements may be determined by advertisers and received by the ad pricing module 222 through a user interface on the social networking system 100 or through an API. Based on the score generated by the cluster analysis module 504, a targeting cluster of users may be assigned an expected value proportional to the expected value of one or more highly valued populations. In this way, a particular venue may "sell" it's customers to other advertisers and be given an expected value of the users of the social networking system 100 that are currently located at the venue.

A pricing refinement module 508 may be used to receive feedback from advertisers to refine the model used to score targeting clusters of users. In one embodiment, the pricing refinement module 508 may use regression analysis to determine and refine weights in the prediction model. In another embodiment, the pricing refinement module 508 may use machine learning methods to train the model to identify whether a targeting cluster of users represents a highly valued population. In a further embodiment, as the market demand and/or supply increases or decreases, the pricing refinement module 508 may be used to redefine the prediction models according to the market forces.

Figure 6:
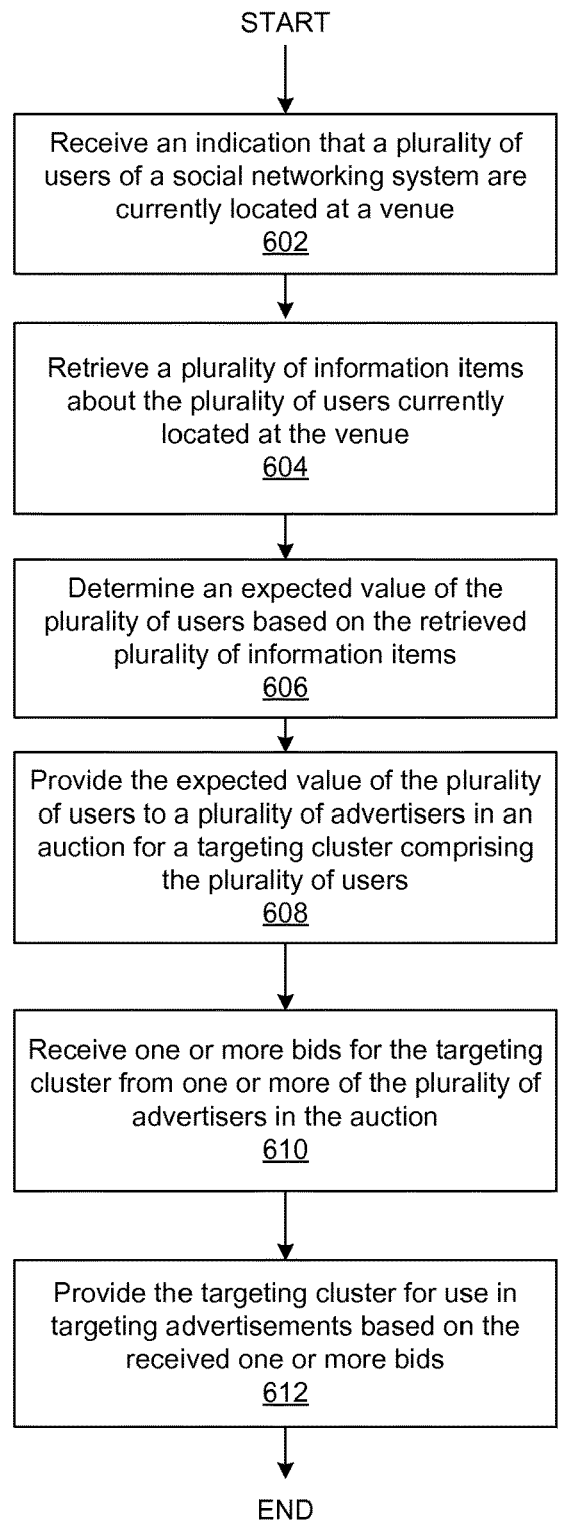
FIG. 6 is a flowchart of a process of determining an expected value of users located at a particular venue for ad targeting in a social networking system, in accordance with an embodiment of the invention.

FIG. 6 is a flowchart of a process of determining an expected value of users located at a particular venue for ad targeting in a social networking system, in accordance with an embodiment of the invention. An indication is received 602 that a plurality of users are currently located at a venue. The indication may be received 602 from the social networking system 100 based on one or more check-in events received from one or more of the plurality of users identifying the other users of the plurality of users, in one embodiment. In another embodiment, the indication may be received 602 based on a geographic location received from one or more of the users of the plurality of users. In a further embodiment, the indication may be received 602 based on a user checking into the venue and tagging the remaining users in the same post. In yet another embodiment, the plurality of users provide the indication that they are currently located at the venue based on separate check-in events.

A plurality of information items are retrieved 604 about the plurality of users currently located at the venue. The plurality of information items that are retrieved 604 include information items in user profiles, edges, content items, action logs, custom graph objects and actions, and information about connections of the plurality of users currently located at the venue. A previous history of clicking on advertisements, of checking into the venue, and expressing interest in topics and keywords associated with the venue may also be retrieved 604.

An expected value of the plurality of users is determined 606 based on the retrieved plurality of information items. The social networking system 100 may determine 606 the expected value of the plurality of users by matching the plurality of users to one or more valued populations of users based on the characteristics of the populations matching the characteristics of the plurality of users based on the plurality of information items. Highly valued populations may include high-income users, highly-educated users, users that travel frequently, users that use the Internet heavily, users that have a car, users having a good time with close friends, users with children, married users, users that are homeowners, and so on.

The expected value of the plurality of users is then provided 608 to a plurality of advertisers in an auction for a targeting cluster comprising the plurality of users. The auction for the targeting cluster may be initiated by venue owners wishing to "sell" their customers to advertisers in exchange for a commission or revenue share. The expected value of the plurality of users may be provided in conjunction with a venue that is being auctioned, in one embodiment. In another embodiment, the targeting cluster of users may be provided in the auction as targeting criteria, such that the expected value of the plurality of users affects the asking price of the targeting cluster.

One or more bids for the targeting cluster are received 610 from one or more of the plurality of advertisers in the auction. A highest bidder may "win" the exclusive right to use the targeting cluster for advertising purposes, in one embodiment. In another embodiment, multiple bidders may win the right to use the targeting cluster for advertising purposes based on the bids meeting or exceeding a predetermined threshold. The targeting cluster is then provided 612 for use in targeting advertisements based on the received one or more bids.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    maintaining profiles for a plurality of users of a social networking system;
    maintaining a social graph of nodes representing objects in the social networking system connected by edges;
    receiving a request from an advertiser to target a subset of the plurality of users of the social networking system, the request comprising at least one profile attribute for the subset of users and a query for an online social networking user trend corresponding to a first action type;
    retrieving social graph information for the targeted subset of users of the social networking system for an edge corresponding to the first action type;
    determining, by a processor, an online social networking user trend for the targeted subset of users based on the social graph information for the targeted subset of users, the online social networking user trend comprising an action of the first action type taken in the social networking system being followed by an action of a second action type taken by the subset of users;
    predicting, by the processor, that an action of the second action type is likely to be taken by the targeted subset of users based on the determined social networking user trend;
    generating an advertisement offer based on the determined user trend for the advertiser for the targeted subset of users, the advertisement offer corresponding to the predicted action of the second action type; and
    providing the generated advertisement offer to the advertiser responsive to the request.

2. The method of claim 1, wherein the targeted subset of users further comprises a plurality of users that share an interest in the social networking system specified by the advertiser.

3. The method of claim 1, wherein the targeted subset of users further comprises a plurality of users that are currently performing an action specified by the advertiser.

4. The method of claim 1, wherein the targeted subset of users further comprises a plurality of users that are currently located at a venue as determined by the social networking system.

5. The method of claim 1, wherein the targeted subset of users further comprises a plurality of users that are grouped by the social networking system as a crowd resulting from a fuzzy match.

6. The method of claim 4, wherein the plurality of users currently located at the venue is determined based on one or more check-in event objects.

7. The method of claim 1, further comprising:
    determining one or more proximate services, where a proximate service comprises a service that is performed within a time period of the first action type being followed by a second action type; and
    wherein generating the advertisement offer is directed at one of the determined one or more proximate services.

8. A non-transitory computer-readable storage medium storing executable computer program instructions, the computer program instructions comprising instructions for:
    maintaining profiles for a plurality of users of a social networking system;
    maintaining a social graph of nodes representing objects in the social networking system connected by edges;
    receiving a request from an advertiser to target a subset of the plurality of users of the social networking system, the request comprising at least one profile attribute for the subset of users and a query for an online social networking user trend corresponding to a first action type;
    retrieving social graph information for the targeted subset of users of the social networking system for an edge corresponding to the first action type;
    determining, by a processor, an online social networking user trend for the targeted subset of users based on the social graph information for the targeted subset of users, the online social networking user trend comprising an action of the first action type taken in the social networking system being followed by an action of a second action type taken by the subset of users;
    predicting, by the processor, that an action of the second action type is likely to be taken by the targeted subset of users based on the determined social networking user trend;
    generating an advertisement offer based on the determined user trend for the advertiser for the targeted subset of users, the advertisement offer corresponding to the predicted action of the second action type; and
    providing the generated advertisement offer to the advertiser responsive to the request.

9. The non-transitory computer-readable storage medium of claim 8, wherein the targeted subset of users further comprises a plurality of users that share an interest in the social networking system specified by the advertiser.

10. The non-transitory computer-readable storage medium of claim 8, wherein the targeted subset of users further comprises a plurality of users that are currently performing an action specified by the advertiser.

11. The non-transitory computer-readable storage medium of claim 8, wherein the targeted subset of users further comprises a plurality of users that are currently located at a venue as determined by the social networking system.

12. The non-transitory computer-readable storage medium of claim 8, wherein the targeted subset of users further comprises a plurality of users that are grouped by the social networking system as a crowd resulting from a fuzzy match.

* * * * *